US012650291B2

(12) United States Patent
Schricker et al.

(10) Patent No.: US 12,650,291 B2
(45) Date of Patent: Jun. 9, 2026

(54) METHOD FOR CORRECTING A MISALIGNMENT OF AT LEAST ONE SHAFTING

(71) Applicant: AVL LIST GMBH, Graz (AT)

(72) Inventors: Alexander Schricker, Graz (AT);
Jakob Moder, Unzmarkt (AT);
Andreas Neubauer, Nestelbach (AT);
Erwin Reisinger, Feldkirchen bei Graz
(AT); Michael Messner, St. Ulrich bei
Steyr (AT)

(73) Assignee: AVL LIST GMBH, Graz (AT)

( * ) Notice: Subject to any disclaimer, the term of this patent is extended or adjusted under 35 U.S.C. 154(b) by 287 days.

(21) Appl. No.: 18/261,525

(22) PCT Filed: Jan. 14, 2022

(86) PCT No.: PCT/AT2022/060010
§ 371 (c)(1),
(2) Date: Jul. 14, 2023

(87) PCT Pub. No.: WO2022/150864
PCT Pub. Date: Jul. 21, 2022

(65) Prior Publication Data
US 2024/0077299 A1      Mar. 7, 2024

(30) Foreign Application Priority Data
Jan. 15, 2021    (AT) ............................... A 50011/2021

(51) Int. Cl.
*G01B 7/31*          (2006.01)
*G01L 1/16*          (2006.01)
(Continued)

(52) U.S. Cl.
CPC .................. *G01B 7/31* (2013.01); *G01L 1/16*
(2013.01); *G01M 1/24* (2013.01); *G01M 15/02*
(2013.01)

(58) Field of Classification Search
CPC .......... G01B 7/315; G01B 7/312; G01B 7/31;
G01M 15/12; G01M 1/24
See application file for complete search history.

(56) References Cited

U.S. PATENT DOCUMENTS 4,741,231 A * 5/1988 Patterson ........... B23Q 17/0966
73/104
4,775,947 A * 10/1988 Marron .................. G01B 7/282
33/550
(Continued)

FOREIGN PATENT DOCUMENTS

CN        101539413       9/2009
CN        104458258       3/2015
(Continued)

OTHER PUBLICATIONS

Wang et al. "Double Fed Induction Generator Shaft Misalignment Monitoring by FBG Frame Strain Sensing," IEEE Sensors Journal, Aug. 2020, vol. 20, No. 15, pp. 8541-8551.
(Continued)

*Primary Examiner* — Tran M. Tran
(74) *Attorney, Agent, or Firm* — Sheridan Ross P.C.

(57)        ABSTRACT
The invention relates to a method for correcting a misalignment of at least one shafting of a powertrain on a test bench, where at least one piezoelectric force sensor is arranged in a path of force via which a force flow can be transmitted between a load unit of the test bench and a drive unit of the powertrain or the test bench during a transmission of power via the shafting, comprising: performing a force measurement in at least one plane and/or perpendicular to the at least one plane which is intersected by a rotational axis of the
(Continued)

shafting and may be substantially perpendicular to the rotational axis; analyzing a measured value or a measured value progression of the force measurement for detecting a misalignment of the shafting; determining target values for a position correction of the load unit or the drive unit in order to minimize the misalignment; and outputting the target values.

18 Claims, 6 Drawing Sheets

(51) Int. Cl.
    *G01M 1/24*        (2006.01)
    *G01M 15/02*       (2006.01)

(56)                References Cited

U.S. PATENT DOCUMENTS

| | | | | |
|---|---|---|---|---|
| 5,263,261 | A | * | 11/1993 | Piety ........................ G01B 7/31 |
| | | | | 33/645 |
| 5,396,436 | A | | 3/1995 | Parker et al. |
| 5,502,650 | A | | 3/1996 | Naruse et al. |
| 5,514,952 | A | * | 5/1996 | Parkinson .............. G01B 7/312 |
| | | | | 324/207.25 |
| 5,526,282 | A | * | 6/1996 | Nower ..................... G01B 7/31 |
| | | | | 700/279 |
| 5,621,655 | A | * | 4/1997 | Nower ..................... G01B 5/25 |
| | | | | 700/279 |
| 5,761,958 | A | * | 6/1998 | Tascillo ................... G01D 3/08 |
| | | | | 73/862.18 |
| 5,922,977 | A | * | 7/1999 | Evans .................... B23Q 17/00 |
| | | | | 73/865.8 |
| 7,059,202 | B2 | * | 6/2006 | Stanos ................. G01L 5/0033 |
| | | | | 73/862.043 |
| 7,266,997 | B2 | * | 9/2007 | Proksch .............. G01Q 10/065 |
| | | | | 73/105 |
| 7,770,440 | B2 | * | 8/2010 | Langthaler .......... G01M 13/025 |
| | | | | 73/114.25 |
| 8,096,698 | B2 | * | 1/2012 | Yamaguchi ............. B29B 7/728 |
| | | | | 366/100 |
| 8,209,151 | B2 | * | 6/2012 | Gruaz ...................... G01D 3/08 |
| | | | | 702/104 |
| 8,322,223 | B2 | * | 12/2012 | Arar ....................... G01B 21/24 |
| | | | | 73/659 |
| 8,578,772 | B2 | * | 11/2013 | Becker ................ G01M 13/045 |
| | | | | 73/460 |
| 8,633,685 | B2 | * | 1/2014 | Wipenmyr ............. G01B 7/312 |
| | | | | 324/202 |
| 8,726,715 | B2 | * | 5/2014 | Cottogni ............... G01L 25/003 |
| | | | | 73/1.09 |
| 9,097,510 | B2 | * | 8/2015 | Kron ........................ F16D 3/50 |
| 9,182,211 | B2 | * | 11/2015 | Jones ........................ F41G 3/32 |
| 9,261,424 | B2 | * | 2/2016 | Vietsch ................... G01B 21/24 |
| 9,453,781 | B2 | * | 9/2016 | Kokal ................... G01M 15/02 |
| 9,517,761 | B2 | * | 12/2016 | Kokal ................... B60W 20/00 |
| 9,863,814 | B2 | * | 1/2018 | Rhee ..................... G01J 9/0215 |

| | | | | |
|---|---|---|---|---|
| 9,879,973 | B2 | * | 1/2018 | Boisson ................. G01B 11/16 |
| 10,060,719 | B2 | * | 8/2018 | Linde ........................ G01B 7/31 |
| 10,684,194 | B2 | * | 6/2020 | Ogawa ............... G01M 15/044 |
| 10,746,527 | B2 | * | 8/2020 | Hu .......................... G01B 7/282 |
| 10,768,073 | B2 | * | 9/2020 | Maschmeyer ....... G01M 15/102 |
| 10,962,445 | B2 | * | 3/2021 | Pfeiffer .............. G01M 13/025 |
| 11,105,895 | B2 | * | 8/2021 | Noro ....................... G01S 15/86 |
| 11,243,143 | B2 | * | 2/2022 | Bier ...................... G01M 15/02 |
| 11,255,749 | B2 | * | 2/2022 | Kokal ....................... G06F 5/06 |
| 11,480,422 | B2 | * | 10/2022 | Aloui ....................... G01B 7/31 |
| 11,566,970 | B2 | * | 1/2023 | Pfister ................. G09B 19/167 |
| 11,592,357 | B2 | * | 2/2023 | Vadamalu ............. G01M 15/02 |
| 11,726,004 | B2 | * | 8/2023 | Bier .......................... G01L 3/22 |
| | | | | 73/862.191 |
| 11,740,158 | B2 | * | 8/2023 | Bier ................... G01M 13/025 |
| | | | | 73/115.01 |
| 11,852,545 | B2 | * | 12/2023 | Schricker .............. G01L 3/1464 |
| 12,013,301 | B2 | * | 6/2024 | Schricker ................ G01L 5/162 |
| 12,038,341 | B2 | * | 7/2024 | Kokal ...................... G01L 3/108 |
| 2002/0117012 | A1 | * | 8/2002 | Lee ......................... G01L 3/045 |
| | | | | 73/862.338 |
| 2006/0288764 | A1 | * | 12/2006 | Langthaler .......... G01M 13/025 |
| | | | | 73/116.05 |
| 2009/0063091 | A1 | * | 3/2009 | Foletti ...................... G01B 5/18 |
| | | | | 702/166 |
| 2011/0259103 | A1 | | 10/2011 | Arar |
| 2014/0028298 | A1 | | 1/2014 | Vietsch |
| 2018/0045071 | A1 | * | 2/2018 | Roach .................... F01D 21/06 |
| 2019/0242768 | A1 | * | 8/2019 | Sonderegger ........... G01L 5/167 |
| 2020/0209079 | A1 | | 7/2020 | Neuschaefer-Rube |
| 2023/0133592 | A1 | * | 5/2023 | Kokal .................... G01L 3/108 |
| | | | | 73/862.31 |

FOREIGN PATENT DOCUMENTS

| | | |
|---|---|---|
| CN | 105784266 | 7/2016 |
| CN | 110763134 | 2/2020 |
| DE | 19854687 | 5/2000 |
| DE | 102012023201 | 5/2014 |
| EP | 0770860 | 5/1997 |
| JP | H05-284689 | 10/1993 |
| KR | 10-2018-0083517 | 7/2018 |
| WO | WO 2019/144171 | 8/2019 |
| WO | WO 2021/011982 | 1/2021 |

OTHER PUBLICATIONS

Official Action with Machine Translation for Austria Patent Application No. A 50011/2021, Dated Nov. 26, 2021, 7 pages.
International Search Report and Written Opinion for International (PCT) Patent Application No. PCT/AT2022/060010, dated May 23, 2022, 14 pages.
English Translation of the International Search Report for International (PCT) Patent Application No. PCT/AT2022/060010, dated May 23, 2022, 3 pages.
Official Action with English Translation for Japan Patent Application No. 2023-541985, dated Oct. 7, 2025, 10 pages.
Official Action with English Translation for China Patent Application No. 202280020969.8, dated Mar. 21, 2026, 24 pages.

* cited by examiner

100

1

METHOD FOR CORRECTING A MISALIGNMENT OF AT LEAST ONE SHAFTING

CROSS REFERENCE TO RELATED APPLICATIONS

This application is a national stage application under 35 U.S.C. 371 and claims the benefit of PCT Application No. PCT/AT2022/060010 having an international filing date of 14 Jan. 2022, which designated the United States, which PCT application claimed the benefit of Austria Patent Application No. A 50011/2021 filed 15 Jan. 2021, the disclosures of each of which are incorporated herein by reference in their entireties.

FIELD OF THE INVENTION

The invention relates to a method for correcting a misalignment of at least one shafting of a powertrain on a test bench, wherein at least one piezoelectric force sensor is arranged in a path of force via which a force flow can be transmitted between a load unit of the test bench and a drive unit of the powertrain or test bench during a transmission of power via the shafting. The invention further relates to a test bench on which the method can be implemented.

BACKGROUND

Misalignments result from assembly and manufacturing inaccuracies, settling phenomena and thermal expansion which lead to displacements of a rotating body. Such displacements have a detrimental effect on the function and operating life of the rotating body. Misalignments lead to distorting forces, in particular bending moments and compressive forces, on the rotating body and its bearing.

Patent application WO/2021/011982 discloses various test benches and measuring arrangements for detecting misalignments on test benches using piezoelectric force sensors. The content of this application is also incorporated into the content of the present application by reference.

SUMMARY OF THE INVENTION

The task of the invention is that of providing a method for the detection and/or correction of an imbalance and/or misalignment of a shafting of a powertrain in operation on a test bench as well as a corresponding powertrain test bench.

This task is solved by the independent claims. Advantageous embodiments are claimed in the subclaims.

A first aspect of the invention relates to a method for correcting a misalignment of at least one shafting of a powertrain on a test bench, wherein at least one piezoelectric force sensor is arranged in a path of force via which a force flow can be transmitted between a load unit of the test bench and a drive unit of the powertrain or test bench during a transmission of power via the shafting, which comprises the following work steps:

performing a force measurement in at least one plane and/or perpendicular to the at least one plane which is intersected by a rotational axis of the shafting and is preferably at least substantially perpendicular to the rotational axis;

analyzing a measured value or a measured value progression of the force measurement for detecting a misalignment of the shafting;

determining target values for a position correction of the load unit or the drive unit in order to minimize the misalignment; and outputting the target values.

A second aspect of the invention relates to a powertrain test bench comprising:

a load unit connectable to a shafting to be tested;

at least one piezoelectric force sensor arranged in a path of force via which a force flow is transmitted from the load unit of the test bench during a transmission of power by means of the shafting and configured to perform a force measurement in a plane and/or perpendicular to the plane which is intersected by a rotational axis of the shafting and is preferably at least substantially perpendicular to the rotational axis; and a signal processing device having means configured to perform the force measurement;

means configured to analyze a measured value or a measured value progression of the force measurement for detecting a misalignment of the shafting;

means for determining target values for a position correction of the load unit or the drive unit in order to minimize the misalignment; and means, in particular an interface, for outputting the target values.

Further aspects of the invention relate to a computer program and a computer-readable medium. Accordingly, the method according to the first aspect of the invention can be computer-implemented.

A target value within the meaning of the invention preferably specifies a direction and an amount by which a component to be aligned is to be shifted and/or rotated. Furthermore, a target value can also indicate an absolute value of a direction and a position to which the component to be aligned is to be shifted and/or rotated.

A shafting within the meaning of the invention comprises one or more rotatably connected shafts.

"Transmissible" within the meaning of the invention preferably means "can be transmitted" or "is being transmitted."

A force flow within the meaning of the invention is preferably a path of a force and/or torque in a mechanical system from a point of application, particularly a point of introduction, to a point or multiple points at which the force and/or torque is accommodated by a reactive force and/or a reaction moment. Preferably, the force flow is composed of a force, in particular a transverse force to the shaft's direction of rotation, and a torque, in particular about the rotational axis.

A power flow within the meaning of the invention is preferably a path of power transmission in a mechanical system from a point of introduction to a point or multiple points at which the power is drawn off.

A piezoelectric measuring element within the meaning of the invention preferably comprises a piezoelectric crystal as well as charge dissipation or an electrical connection respectively.

A machine unit within the meaning of the invention is configured to convert energy, preferably kinetic energy, in particular rotation, into electrical energy or vice versa or chemical energy into kinetic energy. A machine unit within the meaning of the invention preferably comprises a housing.

A support apparatus within the meaning of the invention is preferably an apparatus for supporting an element against a force acting on said element and/or a torque acting on said element. A support apparatus is preferably configured to provide a so-called reactive force or bearing reaction force respectively. A support apparatus within the meaning of the invention preferably serves to support the bearing apparatus. Preferably, the support apparatus is a bell housing, a housing of the powertrain or even a base plate.

Detection within the meaning of the invention is preferably a determination and/or a quantification and/or a localization and/or analysis.

Means within the meaning of the invention can be designed as hardware and/or software, in particular a processing unit, particularly a digital processing unit, in particular a microprocessor unit (CPU), preferably data-connected or signal-connected to a memory or bus system and/or having one or more programs or program modules. The CPU can be configured to process commands implemented as a program stored in a memory system, capture input signals from a data bus and/or send output signals to a data bus. A memory system can comprise one or more, in particular different, storage media, particularly optical, magnetic solid-state and/or other non-volatile media. The program can be designed so as to embody or be capable of performing the methods described herein such that the CPU can execute the steps of such methods and can thus in particular detect an imbalance and/or a misalignment.

An incremental encoder within the meaning of the invention can preferably determine individual angular segments and/or full revolutions. In particular, the incremental encoder gives at least one pulse per revolution.

The invention is based in particular on the approach of adjusting a misalignment of a powertrain shafting on a test bench by means of force sensors, in particular force sensors provided for determining torques in test operation on the test bench. Using the invention does away with the need for further measuring methods or measuring instrumentation, particularly the optical methods commonly used in the prior art.

In particular, a shafting does not need to be separately aligned externally; i.e. off the test bench. Instead, detection of the misalignment occurs directly on the test bench through the establishing of a frictional connection between the load unit, a so-called dyno, and the drive unit. The invention thus enables the aligning of a shafting in the assembled state with all assembly inaccuracies such as unequal screw weights, alignment errors, fitting tolerances and manufacturing errors such as eccentricity, asymmetry, density errors, etc.

For the correction-required force measurements, the invention preferably makes use of piezoelectric measuring elements which allow a particularly reliable measurement and, due to their rigidity, add only minor elasticities to the powertrain's vibratory system. The piezoelectric measuring elements are preferably permanently installed in the test bench, whereby a physically unadulterated measurement signal is then able to be recorded. In particular, the measuring elements can be supported by an intermediate plate or base plate.

Since the physical "force" variable is captured directly, a conclusion can be drawn as to the damaging effect on mechanical components. An empirical approach to assessing the condition of machine units is not necessary. Based on the inventive determination of alignment errors, new standards for machine safety could therefore be developed. In addition to gravitational forces, misalignments give rise to other spatially fixed forces or torques; i.e. those not rotating at the rotational speed. The invention enables the determining of misalignments without additional vibration analyses.

Should the shafting's alignment change during operation, the invention enables already detecting this on the test bench and having countermeasures be initiated, for example an emergency stop or load reduction respectively, in order to prevent permanent damage to the powertrain or even the test bench.

Furthermore, target values for correcting the misalignment are inventively determined. An in particular automated position correction of the load unit and/or the drive unit can be made on the basis of these target values. The misalignment can thereby be minimized or even eliminated directly on the test bench. The target value determination greatly simplifies the configuration or calibration of a measuring arrangement, which to this point has generally been performed manually using optical methods. In particular, the time required thereto can be reduced by orders of magnitude. The possibility of automation also enables dispensing with the use of highly qualified personnel for these tasks.

In one advantageous embodiment of the method, the following additional work steps are performed in the determination of the target values:

determining bending moment curves on the shafting on the basis of the measured value or measured value progressions of the force measurement; and determining a bending line of the shafting, particularly in consideration of boundary and connection conditions, on the basis of the determined bending moment curves, wherein the target values are determined by way of the bending line.

In a further advantageous embodiment, the method further comprises the following work steps:

checking whether a bending moment or bending moment curve on the shafting exceeds a threshold value; and iteratively repeating the method upon the threshold being exceeded or terminating the method when the threshold is not exceeded.

An iterative process for optimizing the alignment of the shafting on the basis of the determined bending moments or bending moment curves enables a particularly precise determination of target values.

In a further advantageous embodiment, the method further comprises the following work step:

disengaging a frictional connection between the load unit and the drive unit, particularly by opening a coupling of the shafting.

Disengaging the frictional connection makes it particularly easy to change the position of the load unit and/or drive unit.

In a further advantageous embodiment, the method further comprises the following work step:

changing a position of the load unit and/or drive unit on the test bench on the basis of the output target values.

Preferably, this position change is automated. Further preferably, the test bench comprises an adjusting device to that end which is configured to translationally and/or rotationally change a position of the load unit or the drive unit.

In a further advantageous embodiment, the method further comprises the following work step:

establishing a frictional connection between the load unit and the drive unit.

Preferably, the frictional connection is restored following the position change of the load unit and/or drive unit.

In a further advantageous embodiment of the method, a constant of the shafting specific to the test bench, in particular the product of the modulus of elasticity and modulus of resistance, is determined in order to calculate the bending lines by way of two force measurements at respectively different positions of the drive unit or the load unit.

This thereby enables a measuring arrangement to be calibrated without the material properties of the shafting, in particular its rigidity, being known.

In a further advantageous embodiment of the method, the rotational axis of the shafting is a rotational axis of that shaft of the shafting on which the force measurement is performed.

Preferably, the plane in which the force measurements are performed is defined by bearing points of the shafting on the machine unit on which the force sensors are supported. Further preferably, the plane is defined by the points where the force sensors are arranged.

In a further advantageous embodiment of the method, the force measurement occurs when the shafting is in a stationary state or quasi-stationary state.

A stationary state of the shafting within the meaning of the invention preferably exists when the shafting is not rotating.

A quasi-stationary state of the shafting within the meaning of the invention preferably exists when the shafting rotates at an angular velocity at which a response time of the force sensor is comparatively short in relation to a rate of change of the rotational position of the shafting. In particular, forces can be measured so as to be unaffected by dynamics. Preferably, a magnitude of angular velocity is so small that its inertial mass has little or absolutely no influence, particularly such that in order to stop, the shafting needs a rotational angle range of less than approximately 90°, preferentially approximately 70°, even more preferentially approximately 15°, even more preferentially approximately 10° and most preferentially approximately 5°. Preferably, there are no vibrations of the shafting in the quasi-stationary state.

As a result, misalignment detection can also ensue in a stationary or quasi-stationary state of the shafting. This enables determining the misalignment even before actual test operation on the test bench. Doing so enables preventing damage to the drive unit to be tested or the test bench.

In a further advantageous embodiment of the method, the force measurement is monitored in that the measured value or measured values is/are compared to a threshold value which is indicative of a critical shafting load, wherein rotation of the shafting is stopped or no rotation whatsoever is effected when the threshold value is exceeded.

This can also prevent damage to the drive unit to be tested or the test bench.

In a further advantageous embodiment of the method, a plurality of piezoelectric sensors are provided in the path of force and each force measurement of the piezoelectric sensors is monitored.

In a further advantageous embodiment of the method, a distinction is made during analysis between parallel offset and/or angular offset of the shafting in terms of the misalignment.

The features and advantages described below in relation to the first aspect of the invention apply correspondingly to the further aspects of the invention and vice versa.

In one advantageous embodiment, the powertrain test bench additionally comprises an adjusting device configured to translationally and/or rotationally change a position of the load unit, wherein the powertrain test bench, in particular the signal processing device, further comprises:

means configured to control the adjusting device on the basis of the output target values.

Further advantages and features become apparent from the following description of preferential exemplary embodiments referencing the figures. The figures at least partly schematically show:

BRIEF DESCRIPTION OF THE DRAWINGS

FIG. 1a a top view of an end face of a load unit at which a shaft of the load unit protrudes;

FIG. 1b a side view of the load unit according to FIG. 1a;

FIG. 1c two top views of a measuring arrangement having a first exemplary embodiment of a powertrain test bench and a load unit according to FIGS. 1a and 1b, by means of which a method for correcting a misalignment can be realized;

DETAILED DESCRIPTION

Figures 1A, 1B, 1C:
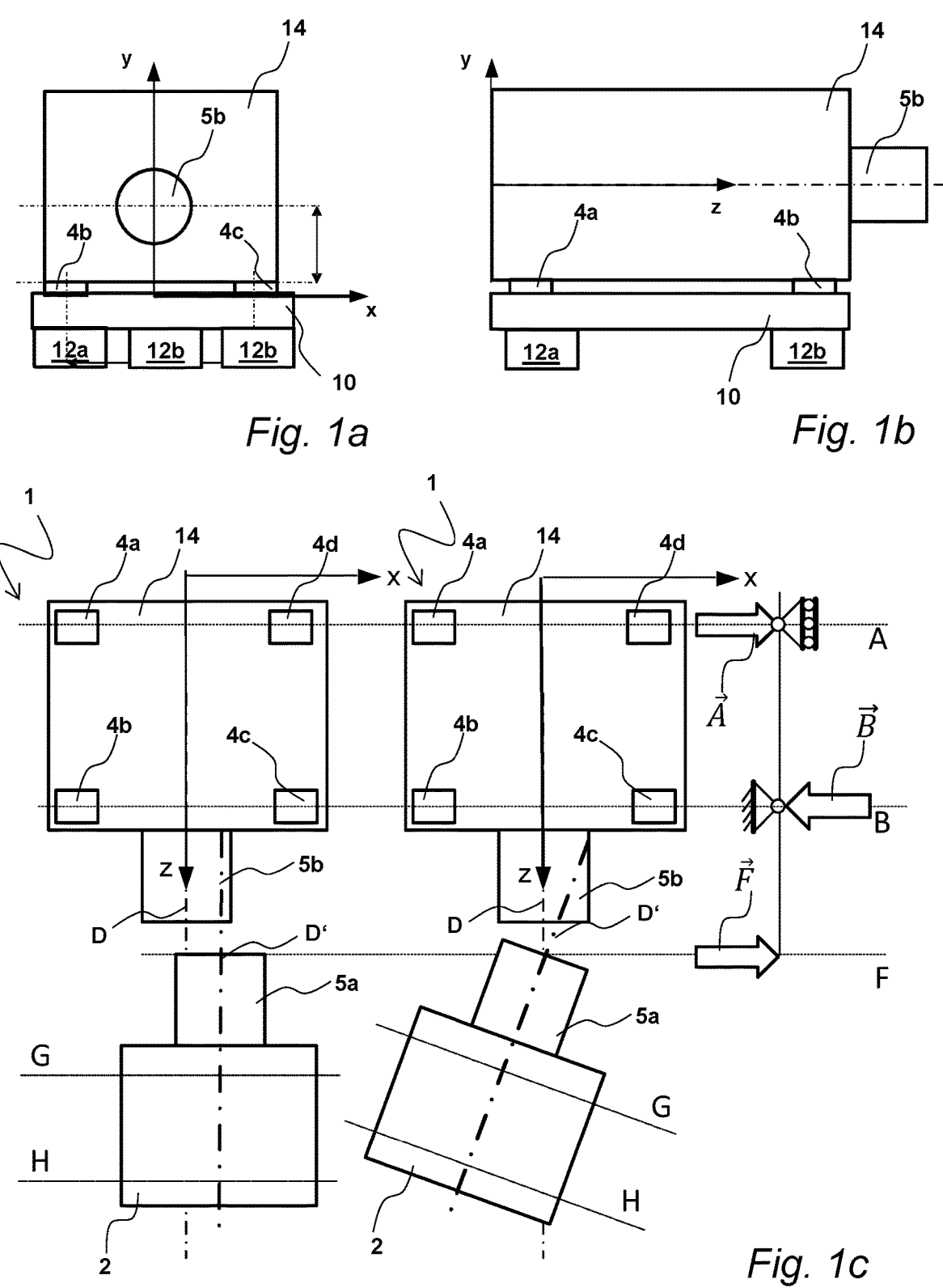

FIGS. 1a, 1b and 1c show three different views of a first exemplary embodiment of a powertrain test bench 1. Both FIGS. 1a and 1b views show only one load unit 14 of the powertrain test bench 1; FIG. 1c shows two views of a measuring arrangement having one of the load units 14 according to FIGS. 1a and 1b and one drive unit 2 to be tested.

The alignment of the individual FIGS. 1a, 1b and 1c views to each other ensues from the respectively drawn x, y, c coordinate axes of a reference system.

FIG. 1a shows a top view in the opposite direction of the z-axis onto an end face of a load unit 14 at which a shaft 5b of the load unit 14 protrudes. FIG. 1b shows a side view along the x-axis of the load unit according to FIG. 1a. The load unit 14 is supported on a base plate or intermediate plate 10 by measuring elements 4a, 4b, 4c, 4d of a force sensor. Preferably, the base plate or intermediate plate 10 also supports the measuring elements 4a, 4b, 4c, 4d horizontally. Preferably, an adjusting device 12a, 12, 12c is provided on the base plate or intermediate plate 10. It preferably has a first actuator 12a, a second actuator 12b and a third actuator 12c in order to shift an alignment of the base plate or intermediate plate 10, and thus also an alignment of the load unit 14, in the direction of the x-axis and/or the y-axis and about the x-axis and/or to pivot the y-axis.

In FIG. 1c, the drive unit 2 and the load unit 14 are each connected or connectable to a shafting in torque-transmitting manner. Said shafting is not fully depicted in this figure for the sake of clarity.

The left-hand view of FIG. 1c shows a measuring arrangement in which the misalignment is strictly a parallel misalignment of a rotational axis D of a shaft 5b of the load unit 14 and a rotational axis DC of a shaft 5a of the drive unit 2 in the x-direction. The right-hand view of FIG. 1c shows a measuring arrangement in which the misalignment is strictly an angular misalignment of a rotational axis D of a shaft 5b of the load unit 14 and a rotational axis DC of a shaft 5a of the drive unit 2 about the y-axis. Generally speaking, however, misalignment presents as a superimposition of angular misalignment and parallel misalignment. Moreover, the drive unit 2 can additionally or alternatively also be shifted in the y-direction and/or pivoted about the x-axis. Furthermore, the measuring elements could also be arranged on the drive unit 2 or in the shafting, as described further below with reference to FIGS. 5, 6 and 7.

Different planes A, B, F, G, H are additionally marked in FIG. 1c. Plane A is a plane aligned perpendicular to the rotational axis D of the load unit 14 and in which there are two measuring elements 4a, 4d arranged at the underside end of the load unit 14 opposite from the shaft 5b of the load unit 14. Plane B is a plane likewise aligned perpendicular to the rotational axis D of the load unit 14 and in which there are two measuring elements 4b, 4c arranged at the underside end of the load unit 14 facing the shaft 5b of the load unit 14.

Plane G is a plane aligned perpendicular to the rotational axis DC of the drive unit 2 and in which there is a first bearing of the shaft 5a of the drive unit 2 arranged on the end of the drive unit 2 facing the shaft 5b of the load unit 14. Plane H is a plane which is likewise aligned perpendicular to the rotational axis DC of the drive unit 2 and in which there is a second bearing of the shaft 5a of the drive unit 2 arranged on the end of the drive unit 2 opposite from the shaft 5b of the load unit 14.

The right-hand part of FIG. 1c shows the forces caused by the respective misalignments depicted in planes A, B and F. In planes A and B, the A, d forces act on the measuring elements 4a, 4b, 4c, 4d supporting the load unit 14. In plane F, the $\vec{F}$ force acts on the (not depicted) shafting.

The method enables the detecting and then correcting of misalignments both in the xz-plane as well as in the yz-plane, in particular simultaneously.

Furthermore, the test bench 1 preferably comprises a signal processing device 7 (not depicted). This will be described further below with reference to FIG. 8.

Figure 2:
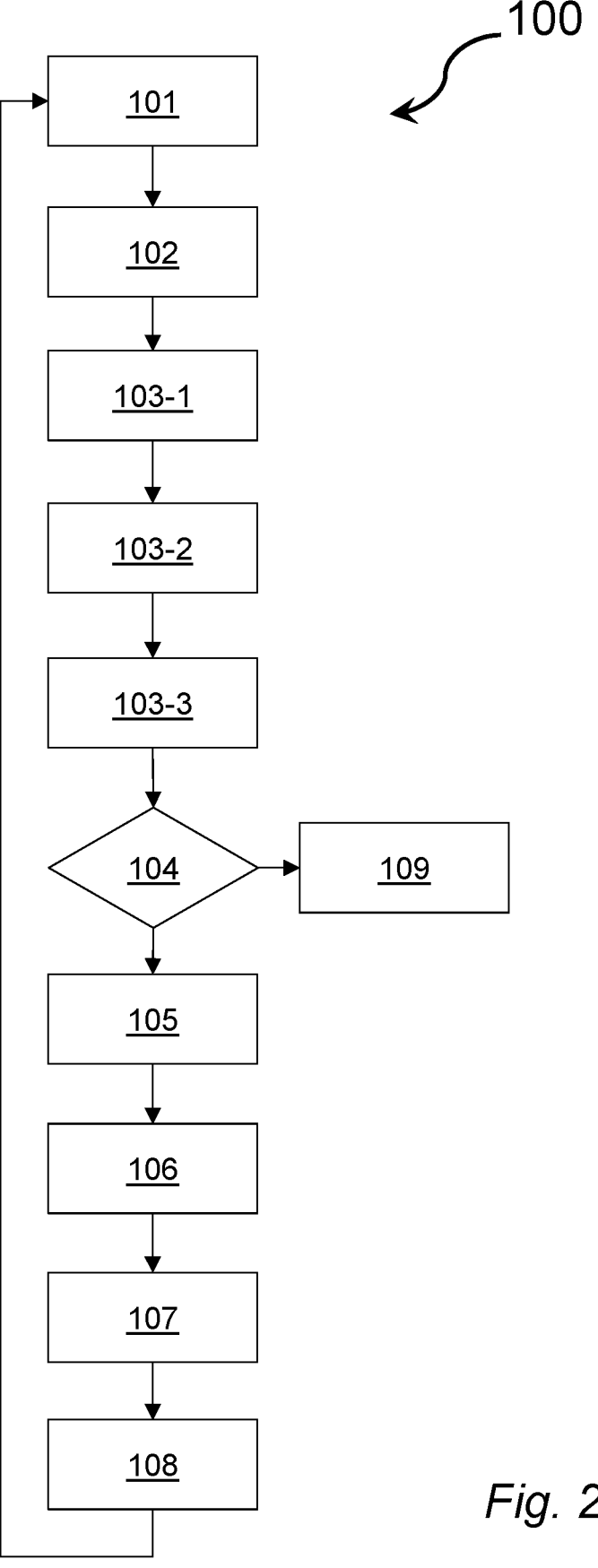
FIG. 2 an exemplary embodiment of a method for correcting a misalignment.

FIG. 2 shows an exemplary embodiment of a method for correcting a misalignment which can be used in a measuring arrangement according to FIGS. 1a to 1c.

After installation of the measuring arrangement, it is preferably calibrated first. Particularly a scaling factor or a constant, in particular the product of the modulus of elasticity and modulus of resistance of the shafting 5; 5a, 5b, preferentially a rigidity constant, is determined to that end. This scaling factor or material constant serves preferably in the calculation of the bending line, as will be explained further below with reference to FIG. 3. Further preferably, the scaling factor or the material constant is determined by two force measurements, each at a different relative position of the drive unit 2 and the load unit 14 to one another.

In a first work step 101 of the method 100, a force measurement is made in planes A, B and/or perpendicular to planes A, B. Planes A, B are intersected by the rotational axis D of the shaft 5b of the shafting 5; 5a, 5b, which is the shaft of load unit 14. Preferably, planes A, B are aligned at least substantially perpendicular to the rotational axis D. Preferably, the rotational axis D is thereby, as depicted in FIG. 1c, the rotational axis of that shaft 5b of the shafting 5; 5a, 5b on which the force measurement is performed; i.e. in relation to which the forces are measured.

Further preferably, the force measurement ensues in stationary states or quasi-stationary states of the shafting 5; 5a, 5b. As previously explained, this thereby enables preventing damage to the measuring arrangement.

Figure 7:
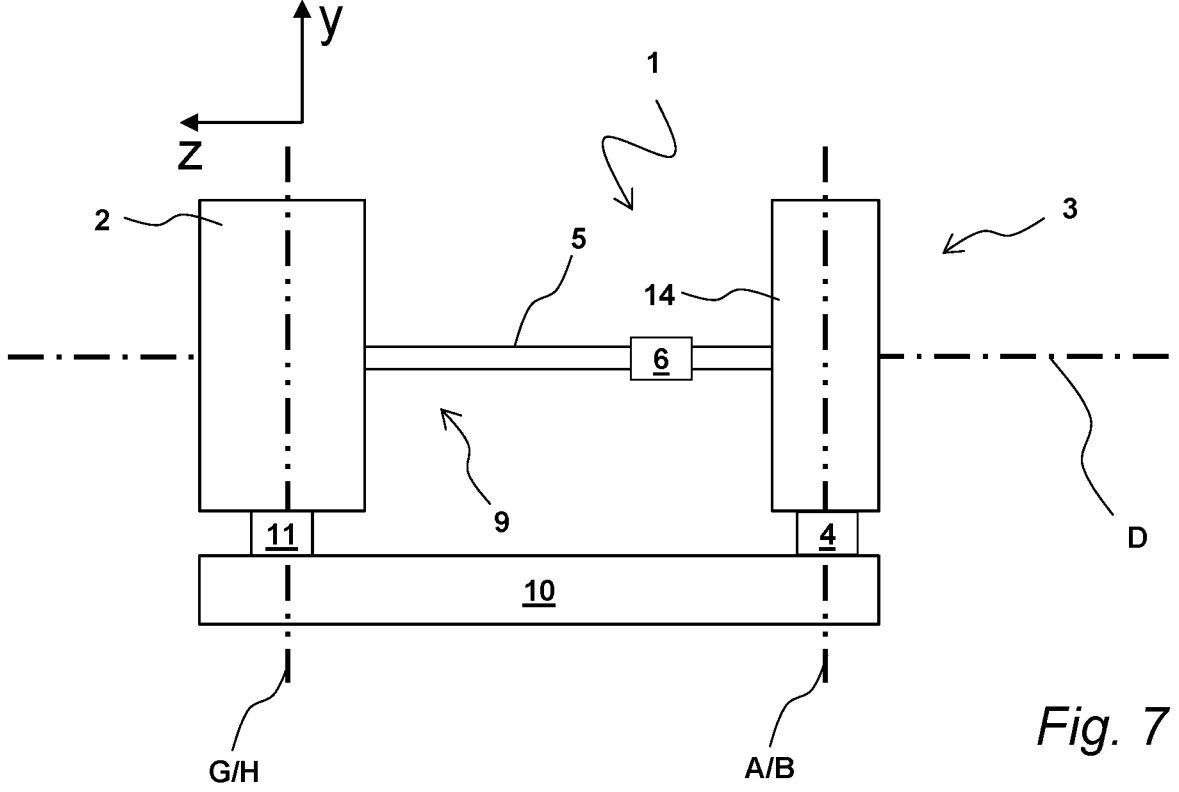
FIG. 7 a top view of a fourth exemplary embodiment of a powertrain test bench.

Further preferably, the force measurement is continuously monitored. In particular, the respective measured value most recently measured is thereby compared to a threshold value which is indicative of a critical shafting 5; 5a, 5b load. Should this threshold value be exceeded, rotation of the shafting 5; 5a, 5b is stopped or no rotation is effected. Moreover, the method 100 is then preferably terminated. Preferably, as depicted in FIG. 7, there are multiple force sensors 4, 11 in the path of force, with each force measurement of the force sensors 4, 11 preferably being monitored in this case.

Any constant circumferential transverse force indicates an angular offset in the shafting and can thus be differentiated from misalignments by the inventive method.

In a second work step 102, a measured value or measured value progression of the force measurement is analyzed for detecting a misalignment of the shafting 5; 5a, 5b. Preferably, a distinction is thereby made between parallel offset and/or angular offset of the shafting 5; 5a, 5b in terms of the misalignment.

In a third work step 103, target values for a position correction of the load unit 14 or the drive unit 2 are determined in order to minimize the misalignment. To that end, bending moments or a bending moment curve on the shafting 5; 5a, 5b is preferably determined in a first sub-step 103-1 on the basis of the measured value or the measured value progressions of the force measurement. In a second sub-step 103-2, preferably a bending line of the shafting 5; 5a, 5b is then determined on the basis of the determined bending moment or bending moment curve in consideration of boundary conditions. The target values of the position correction are then preferably determined using this bending line. Preferably, the misalignment is minimal when the bending line $w_x(z)$ is identical to the rotational axis D.

In a fourth work step 104, a check is made as to whether a bending moment or bending moment curve on the shafting 5; 5a, 5b exceeds a threshold value. If the threshold is exceeded, the method 100 continues and repeats. The target values are output in a fifth work step 105 for this purpose. Preferably, the output is made to the next work step via a data interface 10. Alternatively or additionally, the target values can also be output to a user via a user interface 10.

When the threshold value is no longer exceeded, the method 100 is preferably terminated in a ninth and last work step 109.

Upon continuation of the method 100, the frictional connection between the load unit 14 and the drive unit 2 is preferably interrupted in a sixth work step 106, particularly by opening a coupling (not depicted) of the shafting 5; 5a, 5b. The relative position of the two machine units 2, 14 to one another can thereby be changed without counteracting forces.

In a seventh work step 107, a position of the load unit 14 and/or the drive unit 2 on the test bench is changed on the basis of the output target values. This should thus result in reducing the misalignment.

In an eighth work step 108, the frictional connection between the load unit 14 and the drive unit 2 is then preferably restored. Preferably, the method 100 thereafter starts again at the first work step 101. Alternatively, however, the method 100 can also start again from the beginning after an earlier work step.

Figure 3:
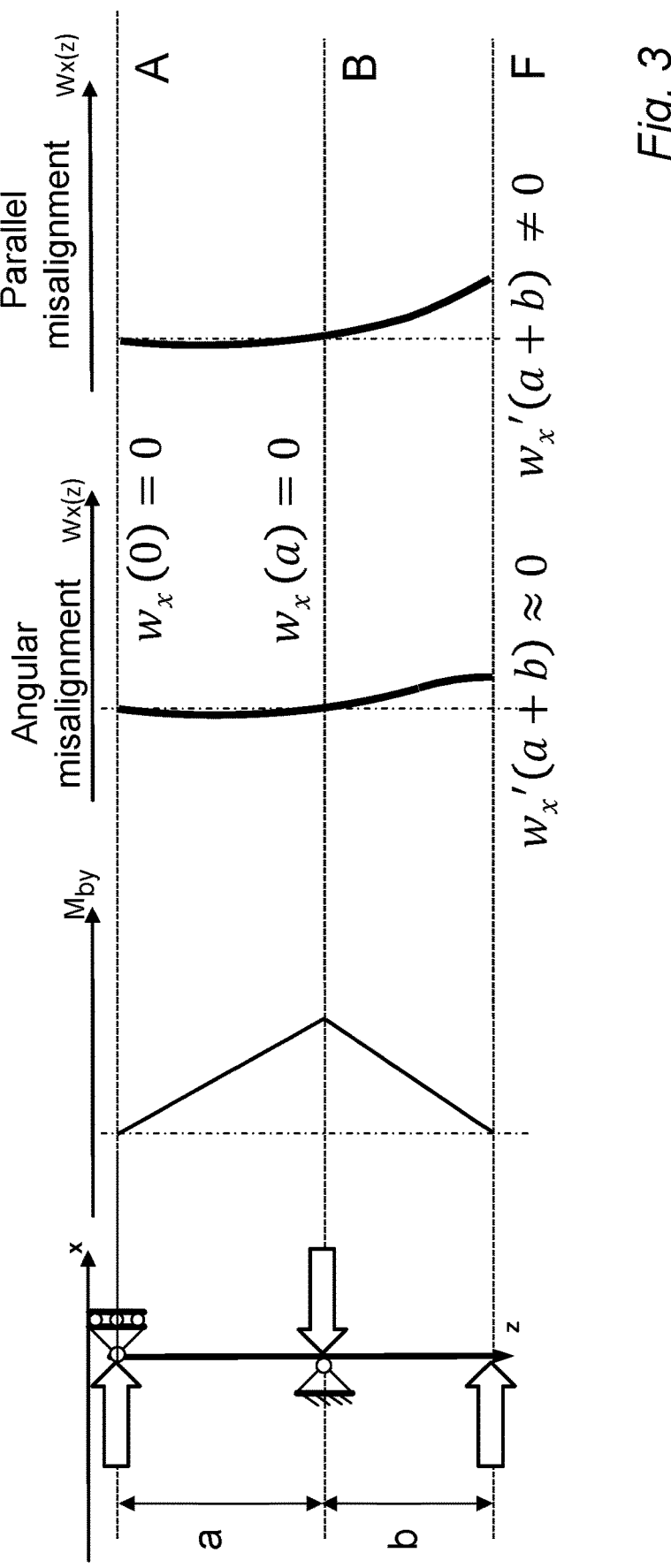
FIG. 3 four diagrams depicting forces, bending moments, a bending line for an angular misalignment and a bending line for a parallel misalignment of a shafting on a test bench.
Figure 4:
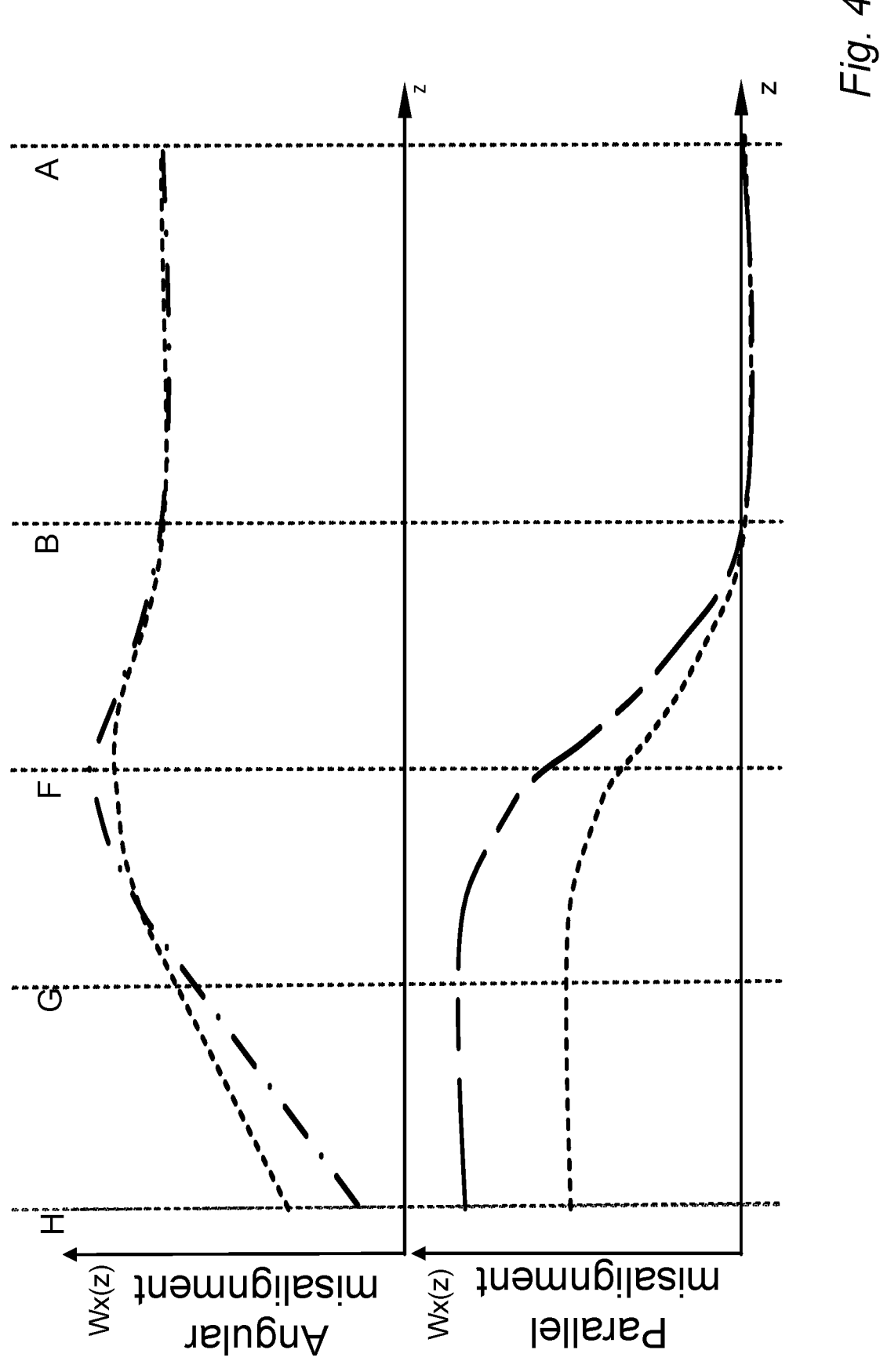
FIG. 4 a diagram with bending lines for parallel misalignment and bending lines for angular misalignment in the axial direction of a shafting.

The following will draw on FIGS. 3 and 4 in illustrating an exemplary calculation of target values on the basis of the forces measured in planes A and B or in plane F.

When the fixedly mounted drive unit 2 and load unit 14 are mechanically connected via the shafting, a frictional connection is established which can be assumed as being a simplified bending beam (assuming a fixed/floating bearing shaft arrangement as depicted in FIGS. 1c and 3).

Depending on the location of the force flow measurement—in the illustrated case, in planes A and B or in plane F— bearing forces $\vec{A}$ and $\vec{B}$ or a misalignment force $\vec{F}$ can be calculated from a resultant moment equilibrium.

Force components $F_x$ and $F_y$ and force component $F_z$ as well as moment components $M_{bx}$ and $M_{by}$ for determining a misalignment can be obtained in an intrinsically known manner via the specific arrangement of the preferential directions of the individual measuring elements 4a, 4b, 4c or their piezo elements respectively.

Other methods for determining these parameters can also be used. For example, decomposition, in particular orthogonal decomposition, of the measurement signals of the individual measuring elements 4a, 4b, 4c or the forces Fi, Fi derived; i.e. measured, from the measurement signals.

For example, the $M_z$, $F_x$, $F_Y$ parameters to be determined are thereby the solution to a set of equations, whereby an equation as follows applies to each measurement signal:

$$S1 = a_{11} \cdot M_z + a_{12} \cdot F_x + a_{13} \cdot F_y$$

$$S2 = a_{21} \cdot M_z + a_{22} \cdot F_x a_{23} \cdot F_y$$

$$S3 = a_{31} \cdot M_z + a_{32} \cdot F_x + a_{33} \cdot F_y$$

. . .

$$SN = a_{N1} \cdot M_z \ldots$$

S1, S2, . . . Si, . . . , SN are thereby the measurement signals of the individual measuring elements 4a, 4b, 4c, . . . 2, N. Each coefficient a depends on a plurality of factors such as, for example, the respective position of the measuring element 4a, 4b, 4c, . . . 4i, 4N and the respective preferential direction's orientation in the reference system, a sensitivity of the respective measuring element 4a, 4b, 4c, . . . , N and possible signal loss due to a force shunt through fixing means.

To solve such a set of equations for the torque $M_z$, a first transverse force component $F_x$ and a second transverse force component $F_y$, measurement signals are needed from at least three measuring elements 4a, 4b, 4c which have preferential directions aligned so as to lie in a single plane. Furthermore, at least two of the preferential directions must be aligned neither parallel nor antiparallel.

For this described general case of N=3; i.e. with three measuring elements 4a, 4b, 4c, the solution to the above-depicted equation set is clear. Should further measuring elements be added to the measuring system 1, the set of equations is overdetermined with three parameters $M_z$, $F_x$, $F_y$ to be determined, however the measuring accuracy can be even further improved.

In the case of N=4, four different sets of equations F (S1, S2, S3), F (S1, S2, S4), F (S1, S3, S4), F (S2, S3, S4) can be constructed. The values determined for the individual parameters $M_z$, $F_x$, $F_y$ to be determined can then be totaled and averaged; i.e. divided by four in the case of four measuring elements 4a, 4b, 4c, . . . , 4i, . . . , 4N. Similarly, an overdetermined set of equations F (S1, S2 . . . , SN) can be constructed to be solved via a minimization problem.

Once a general solution has been found for the equation set, calculation of the parameters $M_z$, $F_x$, $F_y$ to be determined can be reduced to a matrix multiplication. This provides three rows and as many columns as there are measurement signals S1, S2, S3, SN. The matrix elements or coefficients respectively depict the respective contributions of the individual sensors to the parameters $M_z$, $F_x$, $F_y$ to be determined.

$$\begin{pmatrix} Fx \\ Fy \\ Mz \end{pmatrix} = K \begin{pmatrix} c11 & c12 & c13 & \ldots & c1N \\ c21 & c22 & c23 & \ldots & c2N \\ c31 & c32 & c33 & \ldots & c3N \end{pmatrix} \begin{pmatrix} S1 \\ S2 \\ S3 \\ \ldots SN \end{pmatrix}$$

The bending moments $M_{bx}$ and $M_{by}$ can moreover be determined via such a decomposition. Decomposition of the measurement signals S1, S2, . . . Si, . . . , SN into components which contribute to the respective parameters $M_z$, $F_x$, $F_y$ to be determined requires knowing the position of the measuring elements 4a, 4b, 4c, . . . , 4i, . . . , 4N and the orientation of the preferential directions.

The geometric parameters can be determined from a design drawing of the powertrain test bench 1 and from knowledge of the preferential directions of the measuring elements 4a, 4b, 4c, . . . , 2i, . . . , 2N.

The orientation of the preferential directions of the measuring elements 4a, 4b, 4c, . . . , 4i, . . . , 4N can, however, also be determined by measuring the preferential directions using a calibration measurement. Preferably, the force sensor 4, 11 is clamped between two flat plates to that end. In a subsequent step, external transverse forces of a known direction are applied. The preferential direction of the measuring elements 4a, 4b, 4c, . . . , 4i, . . . , 4N in the plane spanned by the preferential direction of the measuring elements 4a, 4b, 4c, . . . , 4i, . . . , 4N can be determined from the magnitude of the individual measurement signals S1, S2, . . . Si, . . . , SN in relation to the magnitude and the direction of the transverse forces introduced.

When the preferential directions of the individual measuring elements 4a, 4b, 4c, . . . , 4i, . . . , 4N are known, a distance of the measuring elements 4a, 4b, 4c, . . . , 4i, . . . , 4N from the rotational axis D can be determined via such a decomposition by applying a defined torque $M_z$ and measuring the individual measurement signals S1, S2, . . . Si, . . . , SN.

As depicted in FIG. 3, on the basis of the forces $\vec{A}$, $\vec{B}$, $\vec{F}$ as determined, the bending moment $M_{by}(z)$ can be determined as a function of the location in the direction of the rotational axis D of the load unit 14; in the direction of the z-axis in the reference system shown.

The relationship between the bending line $w_x(z)$ and the bending moment $M_{by}(z)$ thereby obeys the following differential equation $$w_x(z)'' = -\frac{M_{by}(z)}{E J_y}$$

whereby E is the modulus of elasticity and iy is the modulus of resistance of the measuring arrangement. Both together form a so-called scaling factor which is constant for a specific shafting or a specific measuring arrangement. The scaling factor takes into account a rigidity and a material constant of the respective shafting or shaft section or respective measuring arrangement.

The differential equation can in each case be solved by a polynomial function $w_x(z)$. Said polynomial function $w_x(z)$ indicates the bending line. A corresponding plurality of polynomials $w_x(z)$ incorporating the respective connection conditions can then be determined when solving the coupled differential equation set $w_x(z)''$ for a plurality of shaft sections $5a$, $5b$ of the shafting.

The scaling factor can be determined experimentally by specifying boundary conditions for the bending line $w_x(z)$. The case depicted in FIGS. $1c$ and $3$ shows the boundary conditions of e.g. $w_x(0)=0$ and $w_x(a)=0$. In addition, the derivative for the angular misalignment for the bending line is in any case zero at the $z=a+b$ point; i.e. $w'_x(a+b)=0$. The scaling factor can then be calculated by way of two force measurements at different relative alignments of the drive unit $2$ and the load unit $14$ to one another. Alternatively, however, the scaling factor can also be estimated via an FEM simulation of the shafting or the measuring arrangement.

FIG. $4$ shows two different bending lines $w_x(z)$ for a purely angular misalignment of the rotational axes D, DC from FIG. $1c$ (FIG. $4$ upper portion) and a purely parallel misalignment of the rotational axes D, DC from FIG. $1c$ (FIG. $4$ lower portion) as determined via the depicted calculation method. In each case, the dotted line indicates the bending line at a greater angular misalignment and parallel misalignment than the dashed line.

Of course, separate parallel offsets in the y-direction and angular offsets due to rotation about the x-axis which effect bending lines $w_y(z)$ can also occur. A two-dimensional bending line $w_{xy}(z)$ can then be calculated by superposition. Said super-position is preferably an addition of the bending lines which, due to their orientation, are vectors, thus a vector addition.

FIGS. $5$ to $7$ show further exemplary embodiments of powertrain test benches $1$. Even if the arrangement of the force sensor or force sensors in these exemplary embodiments deviates significantly to some extent from the arrangement depicted with respect to the first exemplary embodiment of FIG. $1$, a calculation of the powertrain's bending moments and bending lines can be reduced to the calculation method as explained above with reference to FIGS. $3$ and $4$.

FIG. $5$ shows a second exemplary embodiment of a powertrain test bench $1$ on which in addition to calibration or application tests, detection of misalignments is possible. In particular, a misalignment can be detected independent of test bench operation.

Among other things, the powertrain test bench $1$ comprises load units, respectively dynos $14a$, $14b$, which are connectable in rotationally fixed manner to a powertrain output as shown in FIG. $1$.

The powertrain test bench $1$ preferably further comprises an incremental encoder $6$ configured to measure an angle of rotation of the shafting $5a$, $5b$. The function of an incremental encoder $6$ is known from the prior art; in particular, it can determine the angle of rotation of the shafting $5a$, $5b$ or a change in the angle of rotation and/or direction photoelectrically, magnetically and/or by means of sliding contacts.

Furthermore, the powertrain $1$ preferably has a force sensor $4$ which in turn preferably comprises a plurality of piezoelectric measuring elements; three piezo-electric measuring elements $4a$, $4b$, $4c$ in FIG. $1$. The measuring elements $4a$, $4b$, $4c$ are arranged on a measuring flange $12$ in the exemplary embodiment according to FIG. $1$ which can be part of the powertrain test bench $1$ or the powertrain $3$. Further preferably, strain gauges can also be used as measuring elements $4a$, $4b$, $4c$.

The measuring flange connects a first shaft section $5a$ to a second shaft section $5b$ of the powertrain $3$. The shafting $5a$, $5b$ rotates about a rotational axis D, which is indicated in FIG. $5$ by dashed/dotted lines.

The drive unit $2$ can both be a component part of the powertrain test bench $1$ or of the powertrain $3$ depending on which components of a powertrain $3$ are to be tested on the powertrain test bench $1$.

In the exemplary embodiment shown in FIG. $5$, the powertrain $3$ comprises the drive unit $2$, the shafting $5a$, $5b$, a differential $13$ as well as axial segments (no reference number). A flow of power can be transmitted from the drive unit $2$ to the load units $14a$, $14b$ via the first shaft section $5a$, the measuring flange $12$, the first piezoelectric force sensor, the differential $13$ and the axial segments.

The test bench $1$ further comprises a support apparatus $10$ on which the drive test bench as a whole, individual elements of the powertrain test bench $1$ and/or even the powertrain $3$ are mounted. The support apparatus $10$ can thereby comprise mechanical structures for supporting the individual elements on, for example, the floor of a test bench hall. Further preferably, the support apparatus $10$ can comprise a base plate or be designed as such.

In the exemplary embodiment shown in FIG. $1$, at least the drive unit $2$ and the power units $14a$, $14b$ are supported by the support apparatus $10$.

The flow of power, which is preferably generated by the drive unit $2$, induces a flow of force which, in the exemplary embodiment shown in FIG. $1$, extends from the support apparatus $10$ via the drive unit $2$, the powertrain $3$ and the load units $14a$, $14b$ in turn back to the support apparatus $10$. The support apparatus $10$ thereby provides the respective reactive forces for supporting the drive unit $2$ and the load unit $14a$, $14b$. The measuring elements $4a$, $4b$, $4c$ are preferably configured and designed to measure forces in the F plane; i.e. a plane parallel to the xy-plane of the depicted reference system. The first force sensor $4$ preferably comprises piezo elements $4a$, $4b$, $4c$ which utilize the piezoelectric shear effect. In the exemplary embodiment shown, forces or respectively torques on the measuring flange $12$ are introduced into the piezo elements $4a$, $4b$, $4c$ via end faces of the measuring elements $4a$, $4b$, $4c$. The end faces of the piezo elements $4a$, $4b$, $4c$ are thereby preferably frictionally connected to a surface of the measuring flange $12$.

When there is a force on the measuring flange $12$ in the x-direction and/or the y-direction of the reference system, the piezoelectric measuring elements $4a$, $4b$, $4c$ thus generate corresponding measurement signals by way of the piezoelectric shear effect. The same applies when a torque acting in the z-direction is applied to the measuring flange $12$.

Alternatively or additionally, the measuring elements $4a$, $4b$, $4c$ can realize a force measurement perpendicular to the first plane F. To that end, the measuring elements $4a$, $4b$, $4c$ preferably utilize the piezoelectric longitudinal effect or the piezoelectric transverse effect. When forces are measured both in the first plane F as well as perpendicular thereto, there are preferably both measuring elements able to measure forces in the z-direction as well as measuring elements able to measure forces in the x-plane or xy-plane. Further preferably, each of the measuring elements $4a$, $4b$, $4c$ comprises at least two piezo elements connected in series with respect to the force flow, whereby a first piezo element utilizes the piezoelectric shear effect and a second piezo element utilizes the piezoelectric transverse or longitudinal effect.

Figures 5, 6:
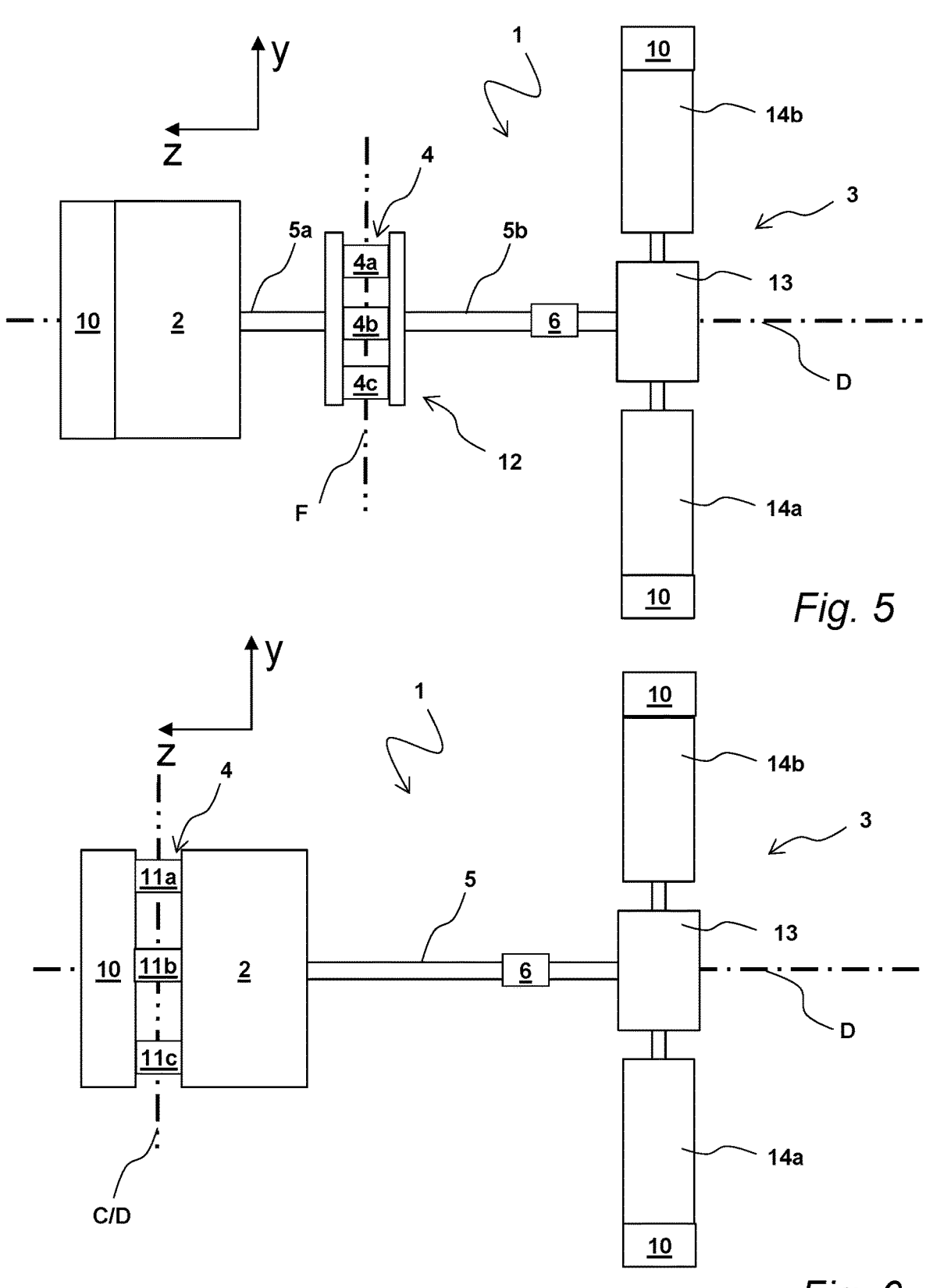
FIG. 5 a top view of a measuring arrangement having a second exemplary embodiment of a powertrain test bench.
FIG. 6 a top view of a measuring arrangement having a third exemplary embodiment of a powertrain test bench.

FIG. 6 shows a third exemplary embodiment of a test bench 1 with which a misalignment of a shafting can be detected during test bench operation.

The substantial difference between the test bench 1 of the second exemplary embodiment from FIG. 6 and the second exemplary embodiment from FIG. 5 is that a force sensor 11 is not arranged in the power flow between the drive unit 2 and the load units 14a, 14b but rather between the support apparatus 10 and the drive unit 2.

Through this arrangement, the first force sensor 4 measures the reactive force that the support apparatus 10 exerts on the drive unit 2 upon torque between the shafting 5 and the drive unit 2.

The force sensor 11 can thereby preferably be supported, as depicted in FIG. 6, in the axial direction of rotational axis D. However, the drive unit 2 could equally also be supported laterally downward or upward by the force sensor 11, as shown in the top view according to FIG. 1a, FIG. 1b or FIG. 7. Depending on how the piezoelectric measuring elements 11a, 11b, 11c engage with the drive unit 2, elements are then employed which have a piezoelectric shear effect, a piezo-electric longitudinal or transverse effect or, as explained above with reference to FIG. 5, two different effects.

In the exemplary embodiment according to FIG. 6 as well, forces are preferably measured in plane C; D and/or perpendicular to the G; H plane.

It is also possible to combine the second exemplary embodiment according to FIG. 5 with the third exemplary embodiment according to FIG. 6: For example, the second exemplary embodiment could thus also have a measuring flange 12 on which a further piezoelectric force sensor is arranged. This second piezoelectric force sensor could then define a second plane F for measuring forces and/or moments.

Moreover, further piezoelectric force sensors for measuring the reactive forces on the load units 14a, 14b could be present and these further piezoelectric force sensors as well could preferably support the respective load unit 14a, 14b relative to the support apparatus, in particular relative to a ground or base plate 10, so that the reactive forces between the load units 14a, 14b and the support apparatus 10 can also be measured here as well.

Compared to directly measuring forces in the shafting 5, the measuring of reactive forces according to FIG. 6 has the advantage of the respective force sensor 4 having no influence on the moment of inertia and the momentum of the shafting 5.

A fourth exemplary embodiment of a powertrain test bench by means of which a misalignment of a shafting can be detected is shown in FIG. 7.

The powertrain 3 comprises only one shafting 5 as well as one drive unit 2 as applicable. In contrast to the first exemplary embodiment of a test bench according to FIG. 1, reactive forces of both the load unit 14 as well as the drive unit 2 vis-à-vis the support apparatus 10 are measured, preferably in respect of at least one measuring plane A, B on the load unit 14 and in respect of at least one measuring plane G, H on the drive unit 2.

Just as in the exemplary embodiments according to FIGS. 5 and 6, the powertrain 1 according to the first exemplary embodiment or according to the second exemplary embodiment can, however, also comprise further elements, particularly a gear mechanism or differential, axial segments, etc.

However, it could also be provided in this exemplary embodiment for the respective force sensor 4, 11 to comprise two elements connected in series with respect to the force flow so that two different measuring directions, in particular two mutually orthogonal measuring directions, are possible. In particular, these measurement directions could be aligned in the y- and x-direction. A force in the z-direction could also be measured by way of a third piezo element in the measuring elements of the force sensors 4, 11.

Figure 8:
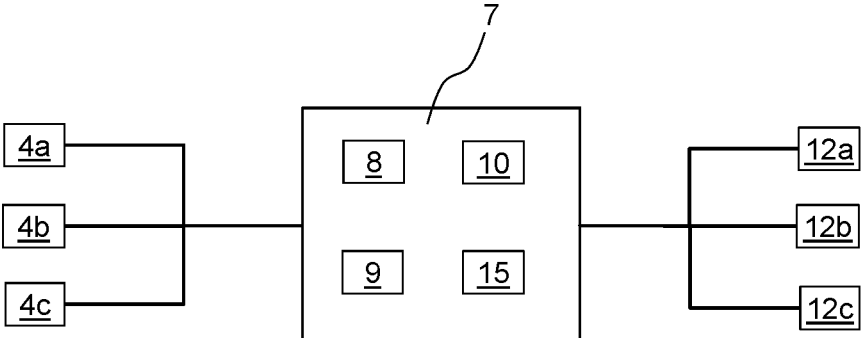
FIG. 8 a detail of the powertrain test benches according to FIGS. 1, 5, 6 and 7.

FIG. 8 shows a detail of a powertrain test bench 1 according to FIG. 1, 5, 6 or 7 or a separate control unit configured to control the powertrain test bench 1.

A signal processing device 7 comprises means 8 configured to analyze a measured value or a measured value profile of the force measurement for the detection of a misalignment of the shafting 5; 5a, 5b, means 9 for determining target values for a position correction of the load unit or the drive unit in order to minimize the misalignment, and means 10, in particular an interface, for outputting the target values. Further preferably, the signal processing device 7 comprises means 15 which control the adjusting device 12a, 12, 12c on the basis of the output target values. The signal processing device 7 is signal-connected both to the measuring elements 4a, 4b, 4c of the force sensor as well as to the adjusting device 12a, 12, 12c.

The exemplary embodiments described above are only examples which are in no way intended to limit the scope of protection, application and configuration. Rather, the foregoing description is to provide the person skilled in the art with a guideline for implementing at least one exemplary embodiment, whereby various modifications can be made, particularly as regards the function and arrangement of the described components, without departing from the scope of protection as results from the claims of its and equivalent combinations of features. In particular, individual exemplary embodiments may be combined with one another, in particular as regards the powertrain test bench or the measuring arrangement. Thus, in particular the exemplary embodiments of the powertrain test bench of FIGS. 5, 6 and 7 could also comprise an adjusting device 12a, 12b, 12c. The sequence of the work steps of the described method 100 can also deviate from that as depicted. Likewise, the force measurement, particularly on the shaft, can be realized by way of sensors based on strain gauges.

LIST OF REFERENCE NUMERALS

1 powertrain test bench
2 drive unit
3 powertrain
4 first piezoelectric force sensor
4a, 4b, 4c piezoelectric measuring element
5, 5a, 5b shafting
6 incremental encoder
7 signal processing device
8, 9, 10, 15 means of signal processing device
11 second piezoelectric force sensor
12 measuring flange
13 differential/gear mechanism
14, 14a, 14b load unit

What is claimed is:

1. A method for correcting a misalignment of at least one shafting of a powertrain on a test bench, wherein at least one piezoelectric force sensor is arranged in a path of force via which a force flow can be transmitted between a load unit of the test bench and a drive unit of the powertrain or of the test bench during a transmission of power via the shafting, the method comprising:

performing, with the at least one piezoelectric force sensor, a force measurement in at least one plane and/or perpendicular to the at least one plane which is intersected by a rotational axis of the shafting;

analyzing, via a signal processing device, a measured value or a measured value progression of the force measurement for detecting a misalignment of the shafting;

determining, via the signal processing device, target values for a position correction of the load unit or the drive unit in order to minimize the misalignment, wherein the determining of the target values further comprises:

determining a bending moment or a bending moment curve on the shafting on the basis of the measured value or the measured value progression of the force measurement; and determining a bending line of the shafting on the basis of the bending moment or the bending moment curve, wherein the target values are determined by way of the bending line; and outputting, via the signal processing device, the target values.

2. The method according to claim 1, further comprising:

checking whether the bending moment or the bending moment curve on the shafting exceeds a threshold value, and either:

iteratively repeating the method if the threshold value is exceeded; or terminating the method when the threshold value is not exceeded.

3. The method according to claim 1, further comprising:

disengaging a frictional connection between the load unit and the drive unit.

4. The method according to claim 3, wherein the disengaging of the frictional connection between the load unit and the drive unit includes opening a coupling of the shafting.

5. The method according to claim 1, further comprising:

changing a position of the load unit and/or the drive unit on the test bench on the basis of the target values outputted.

6. The method according to claim 1, further comprising:

establishing a frictional connection between the load unit and the drive unit.

7. The method according to claim 1, wherein a constant of the shafting is determined for the bending line by way of two force measurements with respect to respectively different positions of the drive unit or the load unit.

8. The method according to claim 7, wherein the constant of the shafting is defined by the product of a modulus of elasticity and a modulus of resistance of the shafting.

9. The method according to claim 1, wherein the rotational axis of the shafting is a rotational axis of a shaft of the shafting on which the force measurement is performed.

10. The method according to claim 1, wherein the force measurement is performed in a stationary state or a quasi-stationary state of the shafting.

11. The method according to claim 1, wherein the force measurement is monitored in that the measured value or the measured value progression is compared to a threshold value which is indicative of a critical shafting load, and wherein rotation of the shafting is stopped or no rotation is effected when the threshold value is exceeded.

12. The method according to claim 1, wherein the at least one piezoelectric force sensor includes a plurality of piezoelectric force sensors provided in the path of force, and wherein a force measurement of each of the plurality of piezoelectric force sensors is monitored.

13. The method according to claim 1, wherein a distinction is made during analysis between parallel offset and/or angular offset of the shafting in terms of the misalignment.

14. The method according to claim 1, wherein the plane is at least substantially perpendicular to the rotational axis.

15. A non-transitory computer-readable medium including a computer program containing instructions which, when executed by a processor of a computer, prompts the computer program to:

analyze a measured value or a measured value progression of a force measurement for detecting a misalignment of at least one shafting of a powertrain on a test bench, wherein the force measurement is performed by at least one piezoelectric force sensor in at least one plane and/or perpendicular to the at least one plane which is intersected by a rotational axis of the shafting, the at least one piezoelectric force sensor being arranged in a path of force via which a force flow can be transmitted between a load unit of the test bench and a drive unit of the powertrain or of the test bench during a transmission of power via the shafting;

determine target values for a position correction of the load unit or the drive unit in order to minimize the misalignment, including to:

determine a bending moment or a bending moment curve on the shafting on the basis of the measured value or the measured value progression of the force measurement; and determine a bending line of the shafting on the basis of the bending moment or the bending moment curve, wherein the target values are determined by way of the bending line; and output the target values.

16. A powertrain test bench, comprising:

a load unit connectable to a shafting to be tested, wherein the shafting is connectable to a drive unit;

at least one piezoelectric force sensor arranged in a path of force via which a force flow is transmitted from the load unit of the powertrain test bench during a transmission of power via the shafting and is configured to perform a force measurement in a plane and/or perpendicular to the plane which is intersected by a rotational axis of the shafting; and a signal processing device in communication with the at least one piezoelectric force sensor, the signal processing device including a processor that:

analyzes a measured value or a measured value progression of the force measurement for detecting a misalignment of the shafting;

d determines target values for a position correction of the load unit or the drive unit in order to minimize the misalignment, wherein to determine the target values the processor further:

determines a bending moment or a bending moment curve on the shafting on the basis of the measured value or the measured value progression of the force measurement; and determines a bending line of the shafting on the basis of the bending moment or the bending moment curve, wherein the target values are determined by way of the bending line; and outputs the target values.

17. The powertrain test bench according to claim 16, wherein the powertrain test bench additionally comprises an adjusting device configured to translationally and/or rotationally change a position of the load unit or the drive unit, wherein the processor of the signal processing device:

controls the adjusting device on the basis of the target values.

18. The powertrain test bench according to claim 16, wherein at least one of:

the plane is at least substantially perpendicular to the rotational axis; and the target values are outputted by the processor via an interface of the signal processing device.

\* \* \* \* \*